Figure 1:
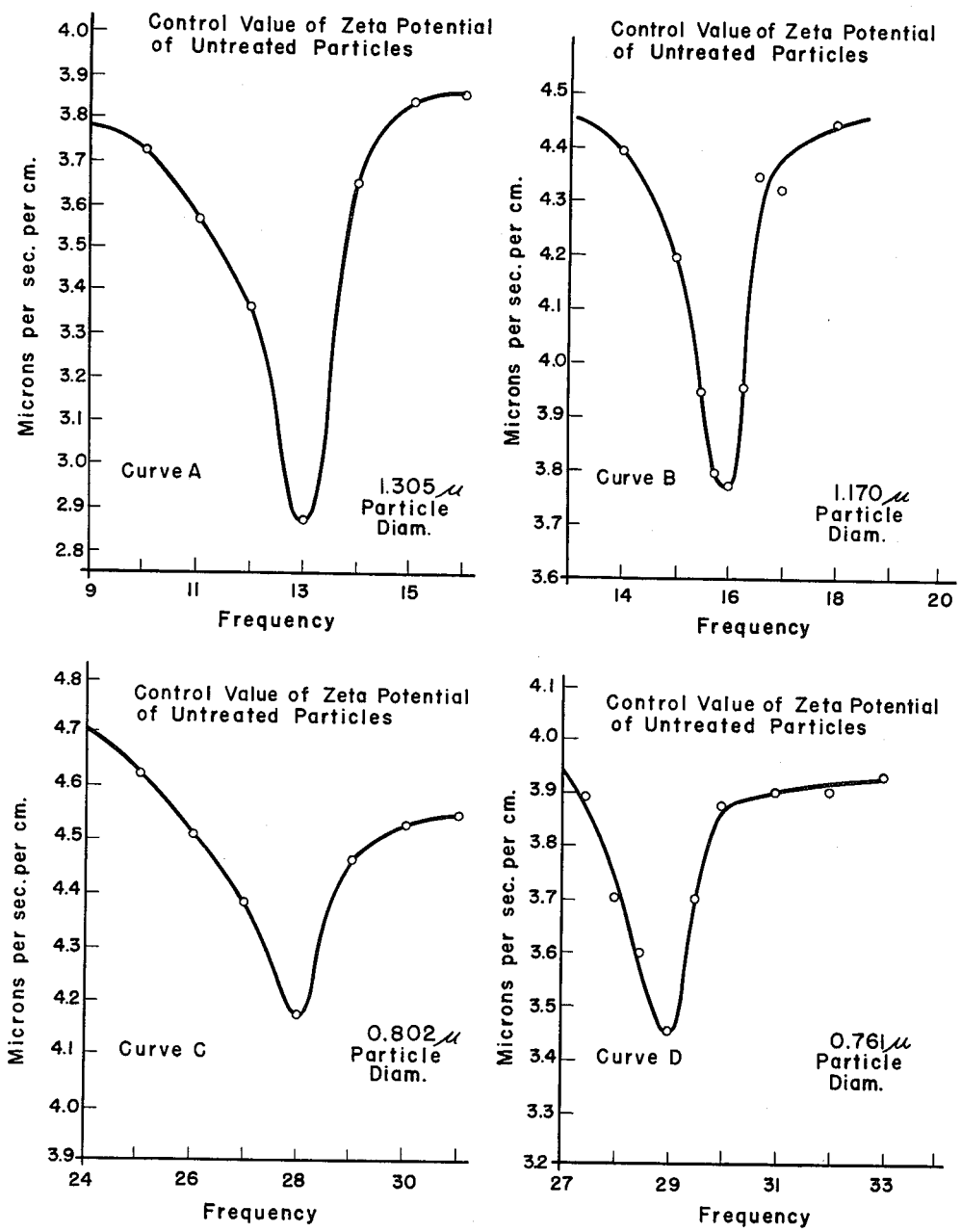

3,256,168
PROCESS FOR CHANGING CHARGES OF MATTER

John H. Heller, Wilton, Conn., assignor to New England Institute for Medical Research, Ridgefield, Conn., a corporation of Connecticut
Filed June 21, 1963, Ser. No. 289,614
4 Claims. (Cl. 204—165)

This application is a continuation-in-part of application Serial No. 853,188, filed November 16, 1959, now Patent No. 3,095,359.

This invention relates to particles of matter having positive or negative charges and has for its object the provision of a process for changing the charges on various forms of matter, including the electrical surface charges.

This invention is based on the discovery that the electrical charges on particles of matter in air or in a liquid suspension under the influence of a particular pulsed radio frequency field can result in a material and significant change in the charge. The change effected is sensational and unpredictable and not presently explainable on a basis of the input energy which is trivial in comparison with the conventionally accepted energy requirements to effect similar changes.

In accordance with the invention various forms of matter, both organic and inorganic having charges in or on the matter, can be treated by exposure of the matter to the radio frequency field to change the charge characteristics of the matter. Various materials exhibit a specificity with respect to the size of the particles in relation to the radio frequency field, its frequency, voltage and the pulses.

Certain experiments were carried out which confirmed the concept of the invention in modifying the charges on particles of matter. Colloidal suspensions of various materials (described hereinafter) were placed in a cuvette measuring 2 x 2 x 4.5 cm. Two opposing sides were of sheet platinum which served as electrodes, the other two sides and bottom were made of ⅛ inch sheet polystyrene. The output from a generator was connected to one electrode and the other electrode was connected directly to ground. This also worked if another generator was used and the cuvette was put in a double-ended configuration. It also worked if a tuned coil was placed across the output and if a beaker was put in the center of the coil containing a solution without any contact with the coil whatsoever. In a typical test operation 15 ml. of a suitably diluted suspension of polystyrene latex or other colloid was introduced into the couvette and exposed to the radio frequency field. After exposure the suspension was removed and the electrophoretic mobility was measured.

The electrical equipment used had the capacity to provide a frequency range of 5–50 mc./sec. with voltage continuously variable from 0–20,000 volts, peak to peak/cm. The output was pulsed so that the resulting heat could be controlled. The pulses duration was varied from 5–100 $\mu$secs. and the pulse repetition frequency (p.r.f.) was variable from 4–1.000 pulses/sec. The changes in the charges of the particles were determined by electrophoretic mobility evaluations. The electrophoretic mobilities were measured in a cylindrical microelectrophoresis cell of the type described by Bangham et al. 2 (Nat. (London) 182, 642 (1958)). The cell was suspended in a temperature controlled water bath and all measurements were made at 25°±0.5°. All electrophoretic results were expressed in microns/sec./volt/cm. and represent the mean of at least ten determinations.

In a series of test operations polystyrene latex (PSL) colloidal suspensions consisting of particles the diameters of which were 1.305$\mu$, 1.17$\mu$, 0.802$\mu$ and 0.761$\mu$ were dialyzed to a dilution of $10^{20}$ times of distilled water and the particle concentrations were determined. In another experiment the PSL particles were coated with gelatin by suspending them in a 5% gelatin solution at 45° C. which was cooled and washed three times by centrifuging in distilled water.

Figure 2:
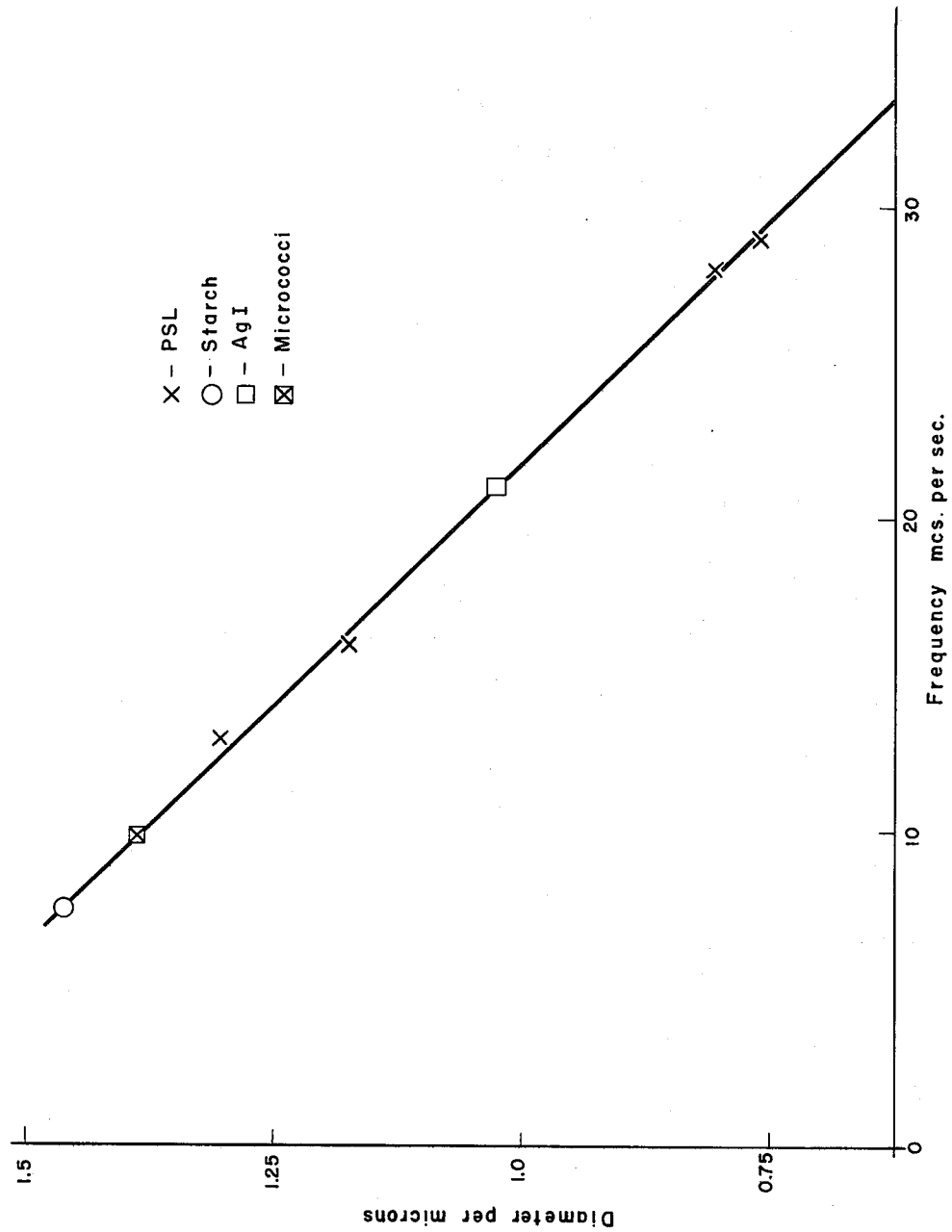

Upon exposure of PSL's of various particle diameters it was found that each size had a specific frequency at which maximum reduction in electrophoretic mobility occured, as shown in FIG. 1. FIG. 2 shows the relationship between the frequency optimum obtained above and the particle diameter. PSL particles having 1.305$\mu$ diameters with adsorbed gelatin were suspended in diluted Michaelis buffer (of ionic strength $10^{-3}$M) at pH 3.1 and pH 10.0. In these media the particles were positively and negatively charged respectively. The maximum charge in mobility, in both cases, occurred after exposure at 13.00 mc./sec.; the positive particles became more positively charged and the negative particles became less negative.

The frequency optimum was found not to alter as a function of added salt up to a concentration of $10^{-3}$M NaCl, although the initial mobilities were different.

Figure 3:
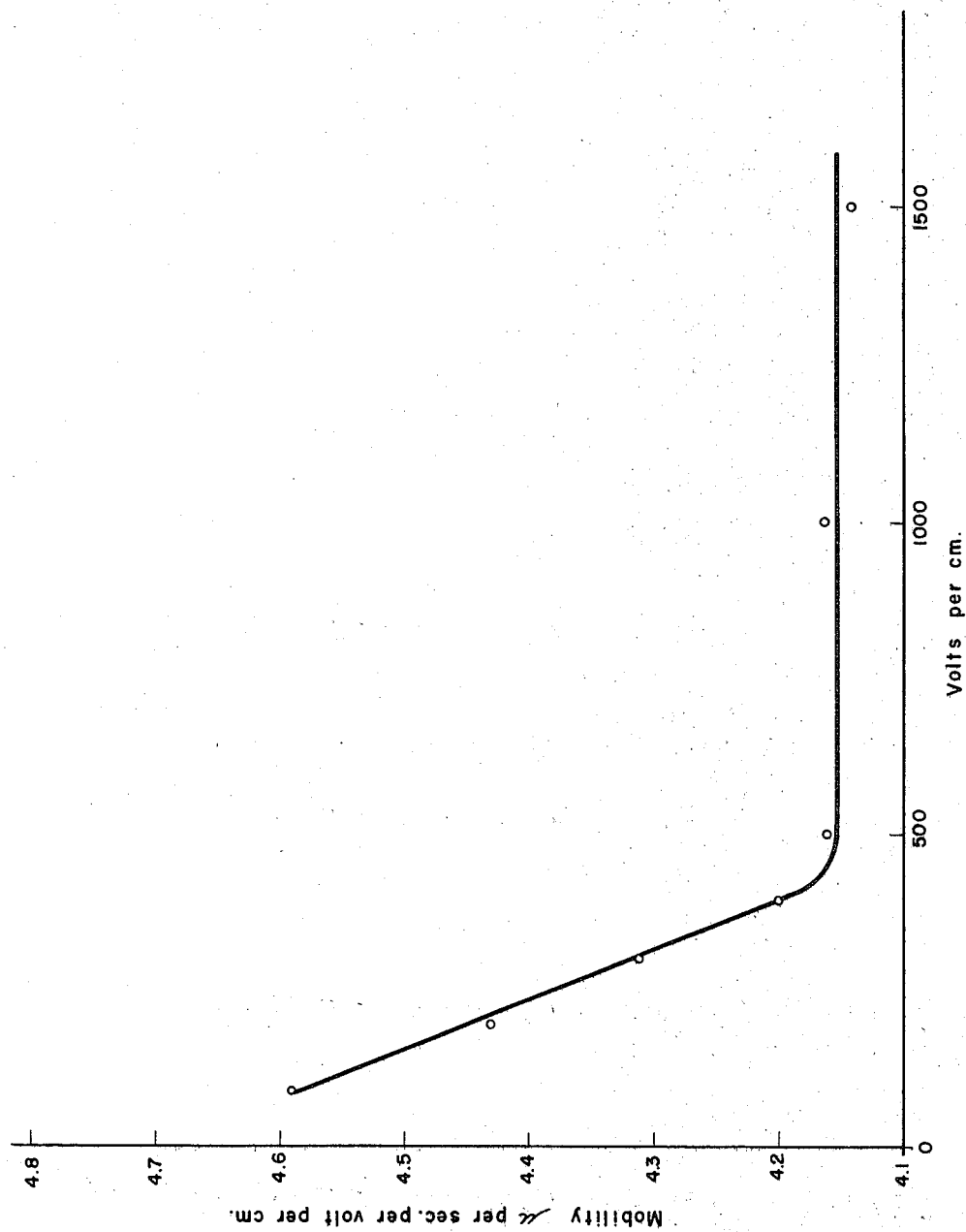

The effect of varying the radio frequency voltage upon the decrease in mobility at 16.00 mc./sec. for the 1.170$\mu$ diameter particles is shown in FIG. 3. It can be seen that there was no further reduction above about 500 volts peak to peak/cm. The same held true for the 1.305$\mu$ diameter particles at 13.00 mc./sec. (1). However the plateau for the 0.802$\mu$ and 0.761$\mu$ particles at their frequency optima was not reached until ca 1,000 volts peak to peak/cm.

The optimum change in mobility in e.g. the 1.305$\mu$ diameter particles, when exposed at 13.00 mc./sec. and 500 volts/cm. for one minute, was obtained using a duty cycle of 0.5%, i.e. a 10$\mu$ sec. pulse at 500 pulses/sec. If the duty cycle was increased, no further change could be induced. However, if the duty cycle was decreased, and the time of exposure increased by the same factor (e.g. increase of time of exposure to 5 mins. and decrease of p.r.f. to 100), then the same results were obtained. If the duty cycle was increased above 0.5%, at a lower voltage however, the reduction of mobility was not as great.

Under the operating conditions described above there was no measurable rise in temperature of the colloidal suspension. If the colloid was cooled to 4° C. or heated to 50° C. before radio frequency exposure, or if heating was induced in the suspension by increasing the radio frequency voltage and/or duty cycle, the same percentage change in mobility was obtained.

After exposure of a colloid under the condition chosen to produce maximum reduction of mobility, the recovery to the initial mobility as a function of time was measured. The mobility was found to recover linearly with time. Table 1 shows the average time required to recover initial mobilities for the various particle sizes.

TABLE 1.—TIME FOR RECOVERY TO INITIAL MOBILITY OF PSL

| Particle Diameter ($\mu$) | Concentration (no./ml.) | Time (hours) |
| --- | --- | --- |
| 1.305 | $8.07 \times 10^6$ | 3.98 |
| 1.170 | $2.12 \times 10^6$ | 3.70 |
| 0.802 | $3.18 \times 10^7$ | 2.95 |
| 0.761 | $3.86 \times 10^7$ | 2.78 |

It can be seen that the time to recover to the initial mobility approximates to a linear function of particle diameter. However, at $10^{-3}$ salt solution, no recovery was noted.

Figure 4:
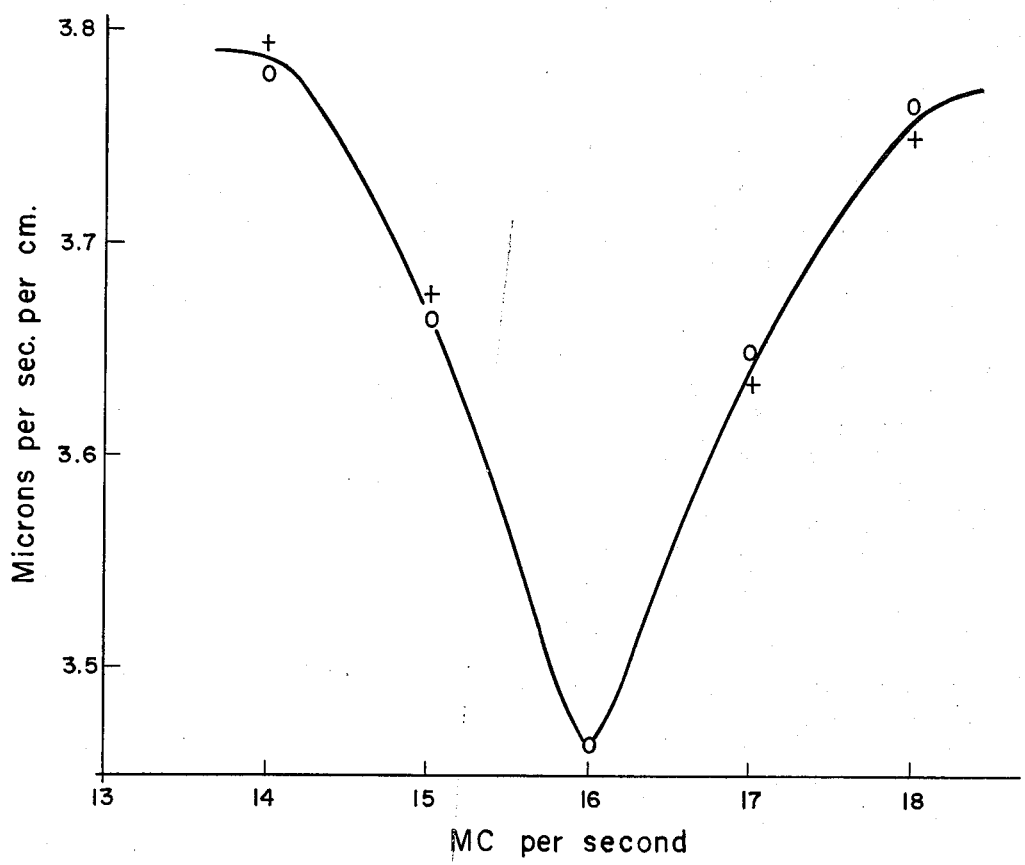

It was found that the initial mobility of the colloid could be recovered by exposure for a further minute at a frequency other than that required to produce maximum reduction. FIG. 4 shows results obtained by exposing a suspension of 1.170$\mu$ particles at the frequency and voltage at which maximum reduction in mobility was obtained, i.e. (16.00 mc. and 500 volts/cm. for one minute) followed immediately by exposure for an additional minute at another frequency.

Figure 5:
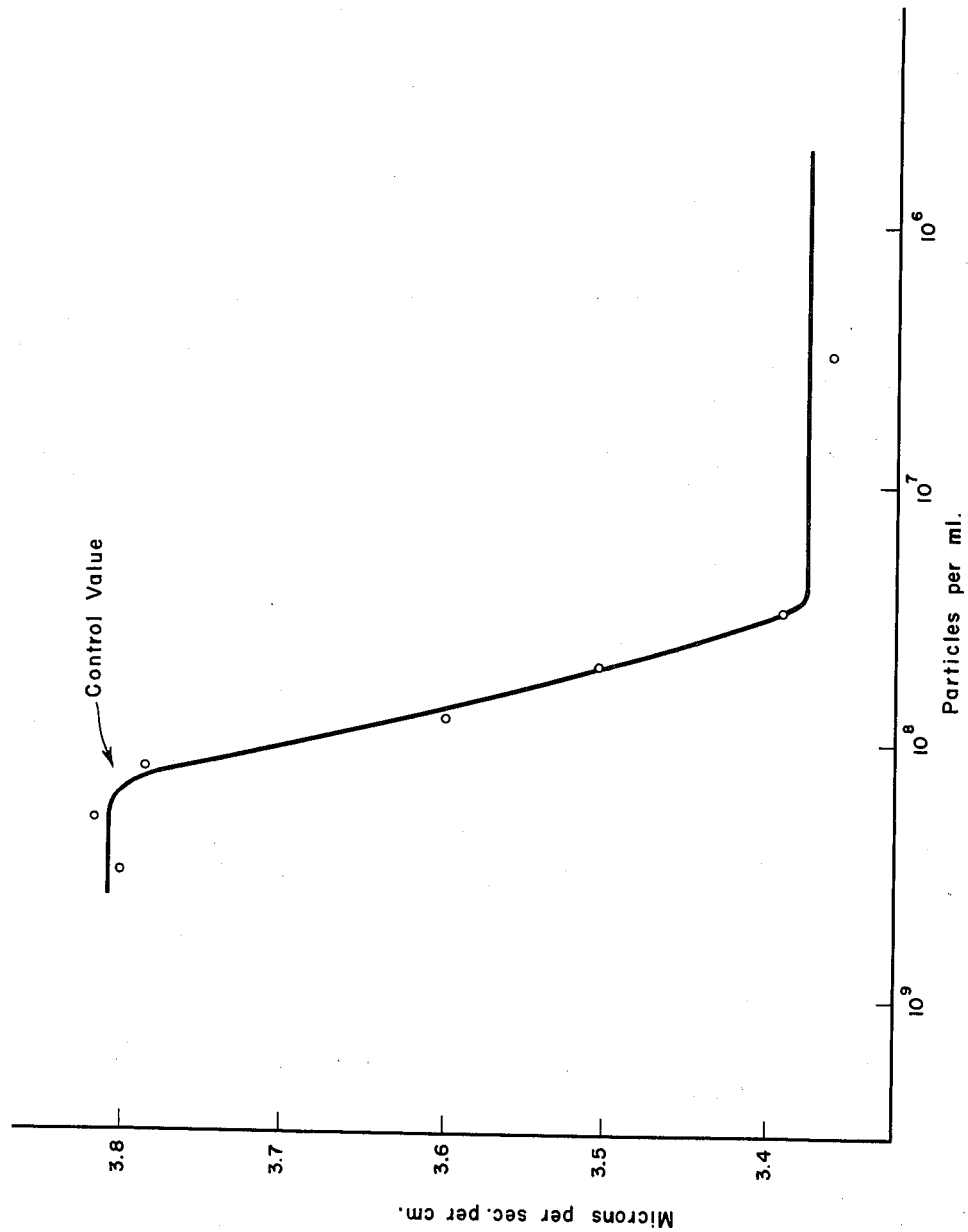

Under optimum conditions of frequency and voltage for maximum reduction of mobility, the effect of varying the concentration of polystyrene was explored. FIG. 5 shows that above a certain concentration (i.e. $10^8$ particle/ml), the RF field produced no reduction in mobility of 0.802$\mu$ diameter PSL and that below a certain concentration ($3\times10^7$ particles/ml.) there was no further reduction in mobility. However, if a suspension of PSL with a particle concentration of $10^8$ particles/ml. was exposed to the radio frequency field under conditions for maximum reduction of mobility and subsequently diluted, it was found that the mobility of the diluted suspension fell at the same place on the curve as it would have, had it been exposed at this dilution in the first place. See FIG. 5.

The surface of undialyzed PSL consists of an absorbed layer of emulsifier (in this case, an alkyl aryl sulfonate). This layer may be removed by dialysis, but the residual charge is still high and is thought to be due to carboxyl groups (from the oxidation of vinyl side chains) and sulfate groups (from a polymerization chain termination step). These groups are linked to the polymer by covalent —C—C— —C—S— bonds. The reduction in electrophoretic mobility is a reflection of a reduction of the surface charge or zeta potential. The same type of change was found in starch particles, in several different size monodisperse of silver iodide, in the micrococci bacteria and on silica particles. The phenomenon then would appear to be general, applying to living, organic and inorganic materials. This change can be achieved in several ways, e.g., by a change in the ionic strength of the medium, but the present important change of interest is one of surface charge density 6.

The process of the invention is applicable to a wide field of industrial uses. In general, the process has utility in which the changes in the charges on matter can be utilized to effect changes in the chemical or physical use of the matter. Specifically, the changes in the magnitude of the charges on colloidal particles can be changed without changing the molecule.

Materials used as detergents, in paints, inks and like materials may be subjected to the radio frequency field to effect changes in the charges. For example, the mineral components of ores in a fine state of subdivision in flotation pulps can be subjeced to the radio frequency field to change the charges to effect a more rapid and complete release of the minerals from the froth. The hydratable clays, such as Bentonite clay, are very sensitive to the effect of electrolytes and may be treated to improve the use of the clay for example in well drilling muds.

It is possible, and indeed probable, that the changes on the surface reflect a more profound change on the interior of the particles. In such an event, this is not just a change of charge on the surface, but reflects either a change in crystalline structure or molecular rearrangement, or even molecular modification.

That which is claimed is:

1. The process for reducing the surface negative electrical charges on non-living particles of matter dispersed in a fluid medium which comprises subjecting said dispersed particles to an R-F field having a frequency selected in the range of 5–50 mc./sec. to effect a maximum reduction in the electrophoretic mobility of said particles, the voltage of said field being less than the value required to produce ionization in the fluid dispersed particles.

2. The process for reducing the surface negative electrical charges on non-living particles of matter dispersed in a fluid medium which comprises subjecting said dispersed particles to a pulse modulated R-F field having a frequency selected to effect a maximum reduction in the electrophoretic mobility of said particles, the voltage of said field being less than the value required to produce ionization in the fluid dispersed particles, the pulse modulation frequency varying in range from 4–1000 pulses/second and the pulse duration from 5–100 microseconds.

3. In the process of claim 1 subjecting colloidal suspensions in an aqueous medium to said R-F field.

4. In the process of claim 1 subjecting organic chemical compounds in colloidal suspension to said R-F field.

References Cited by the Examiner

UNITED STATES PATENTS

| | | | |
|---|---|---|---|
| 2,257,177 | 9/1941 | Luster | 204—168 |
| 2,280,771 | 4/1942 | Dufour et al. | 204—165 |
| 2,553,944 | 5/1951 | Schlesman | 204—312 X |
| 2,966,469 | 12/1960 | Smythe et al. | 204—164 |
| 3,095,359 | 6/1963 | Heller | 195—78 |

JOHN H. MACK, *Primary Examiner.*

WINSTON A. DOUGLAS, *Examiner.*

H. S. WILLIAMS, *Assistant Examiner.*